Aug. 19, 1952  M. DREWES, JR., ET AL  2,607,601
COUPLING FOR FLOOR MACHINE BRUSHES
Filed Dec. 1, 1949

Inventors:
Menke Drewes Jr.
Eugene Lambeau
By Lee J. Gary Atty.

Patented Aug. 19, 1952

2,607,601

UNITED STATES PATENT OFFICE 2,607,601

COUPLING FOR FLOOR MACHINE BRUSHES

Menke Drewes, Jr., and Eugene O. Lambeau, Chicago, Ill., assignors to Breuer Electric Manufacturing Company, Chicago, Ill., a corporation of Illinois Application December 1, 1949, Serial No. 130,554

2 Claims. (Cl. 279—2)

This invention relates to couplings, and is more particularly concerned with the provision of a coupling adapted for use in detachably connecting brush backs to the operating shaft of a disc-type floor treating machine. During the operation of floor treating machines, it is often necessary to replace worn brushes with new brushes and it is, therefore, desirable to provide a coupling means by which brush backs may be quickly engaged or disengaged.

The present invention contemplates the provision of a coupling device comprising a plug member secured to the operating shaft of the floor treating machine to receive and engage a socket member secured to the brush back, the plug member being provided with a plurality of radially disposed spring pressed plungers adapted to engage within recesses formed in the socket member.

This invention further contemplates the provision of a coupling device comprising plug and socket members, the socket member being disconnected from the plug member by merely rotating the socket member in a reverse direction to the normal direction of rotation of the operating shaft.

This invention further contemplates the provision of a coupling device in which the socket member is automatically locked in position upon its coacting plug member by merely inserting the plug member into the socket member and then operating the motor of the floor treating machine.

This invention further contemplates the provision of a coupling device which is relatively simple and inexpensive to manufacture and which will not readily get out of order.

This invention embodies other novel features, details of construction and arrangement of parts which are hereinafter set forth in the specification and claims and illustrated in the accompanying drawing, wherein:

Figure 1:
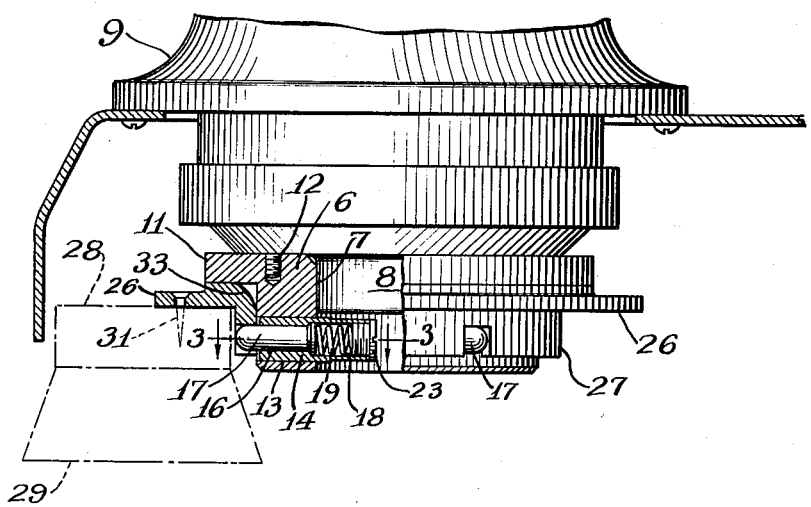
Fig. 1 is a side elevational view, partly in section, showing a coupling device embodying features of the present invention.
Figure 2:
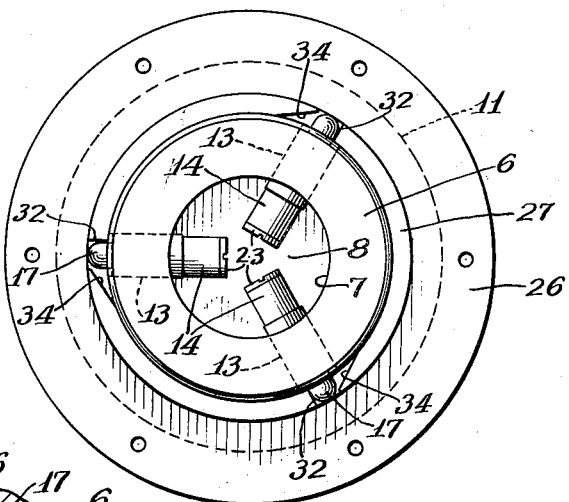
Fig. 2 is a bottom plan view showing a coupling device.
Figure 3:
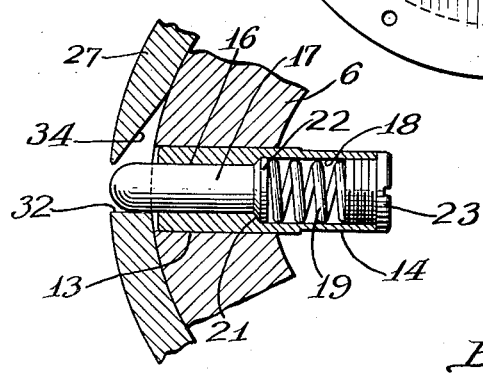
Fig. 3 is a detailed sectional view taken along the line 3—3 of Fig. 1.

Referring now to the drawing for a better understanding of this invention, the coupling for floor treating machine brushes is shown as comprising a cylindrical plug member 6 formed with an axial bore 7 to snugly receive the operating shaft 8 of a floor treating machine 9. The plug member is also preferably formed with an annular flange 11 which is secured to the operating shaft 8 by means of cap screws 12. The outer end of the plug member is formed with a plurality of equally spaced, radially disposed apertures 13 adapted to receive plunger housings 14, the housings having their outer surfaces knurled and forced into their respective apertures under pressure.

One end of each housing 14 is bored at 16 to slidably receive a plunger 17, the other end of the housing being bored at 18 to receive a compression spring 19. The inner end of the bore 18 terminates at a shoulder 21 adapted to normally engage the head portion 22 provided on the inner end of the plunger 17, and the outer end of the bore 18 is threaded to receive a screw 23.

A socket member 26 is telescopically mounted on the plug member 6 and provided at its inner end with an annular flange 27 adapted to be secured to the back 28 of a brush 29 by means of screws 31. The outer end of the socket member is formed with a plurality of recesses 32 to receive the ends of the plungers 17, and the inner end of the socket member is formed with an annular inwardly converging shoulder 33 to engage and force the plungers inwardly when the socket member is being mounted upon the plug member. The socket member is formed with a cam surface 34 adjacent each recess 32 to engage and force a plunger inwardly when the socket member is rotated in a reverse direction to the normal direction of rotation of the operating shaft 8, the cam surface being in circumferential alignment with and extending inwardly from its recess to terminate at the inner surface of the socket member.

In mounting a brush 29 and its socket member 26 upon a plug member 6 secured to the operating shaft 8 of a floor treating machine 9, the brush is positioned upon a floor with the socket member projecting upwardly therefrom. The floor treating machine is then moved to position the plug member in vertical alignment above the socket member and is then lowered to cause the plug member to move downwardly into the socket member. As the plug member moves into the socket member, the plungers 17 are forced inwardly by the inwardly converging shoulder 33 provided on the socket member. After the plug member is fully engaged within the socket member, rotational movement of the operating shaft and plug member relative to the socket member causes the ends of the plungers to move into registry with and engagement in the recesses 32.

In removing a brush and its socket member from the plug member, the brush end of the floor treating machine is first tilted upwardly to raise the brush from the floor. The brush is then manually rotated in a reverse direction to the normal direction of rotation of the operating shaft 8 to cause the cam surfaces 34 to force the plungers 17 inwardly until the ends of the plungers engage the inner surface of the socket member, the brush and socket member then being drawn axially from the plug member.

While this invention has been shown in but one form, it is obvious to those skilled in the art that it is not so limited but is susceptible of various changes and modifications without departing from the spirit and scope of the claimed invention.

We claim as our invention:

1. In a coupling for detachably connecting a brush back to the operating shaft of a floor treating machine, a cylindrical plug member, a tubular socket member for snug telescopic engagement with said plug member, said socket member having a radially disposed recess formed in its lower edge, and a spring pressed plunger mounted on said plug member for radial movement into and out of said socket member recess for detachably securing said socket member on said plug member, said plunger being normally disposed in its outer position and movable inwardly responsive to relative axial and rotational movement of said plug and socket members during engagement or disengagement of said socket member with said plug member, said socket member having a cam surface disposed adjacent to and diverging inwardly from said recess and terminating at the inner periphery of the socket member to engage and move said plunger out of said recess and into engagement with the inner periphery of the socket member responsive to relative rotational movement of said plug and socket members in one direction, the inner end of said socket member being formed with an annular inwardly converging shoulder to engage and move said plunger inwardly during mounting of said socket member upon said plug member.

2. In a coupling for detachably connecting a brush back to the operating shaft of a floor treating machine, a cylindrical plug member, a tubular socket member for snug telescopic engagement with said plug member, said socket member having a radially disposed recess formed in its lower edge, and a spring pressed plunger mounted on said plug member for radial movement into and out of said socket member recess for detachably securing said socket member on said plug member, said plunger being normally disposed in its outer position and movable inwardly responsive to relative axial and rotational movement of said plug and socket members during engagement or disengagement of said socket member with said plug member, said socket member having a cam surface disposed to engage and move said plunger out of said socket member recess responsive to relative rotational movement of said plug and socket members in one direction, the inner end of said socket member being formed with an annular inwardly converging shoulder to engage and move said plunger inwardly during mounting of said socket member upon said plug member, the inner end of said socket member having a flange for engagement with a brush back.

MENKE DREWES, Jr.
EUGENE O. LAMBEAU.

REFERENCES CITED

The following references are of record in the file of this patent:

UNITED STATES PATENTS

| Number | Name | Date |
| --- | --- | --- |
| 599,783 | Hogan | Mar. 1, 1898 |
| 661,558 | Shuff | Nov. 13, 1900 |
| 789,222 | Lovekin | May 9, 1905 |
| 1,119,392 | Bernett | Dec. 1, 1914 |
| 1,814,655 | Andreasson | July 14, 1931 |
| 1,844,446 | Spohr et al. | Feb. 9, 1932 |
| 2,009,371 | Junge | July 23, 1935 |